(12) United States Patent
Hutchinson et al.

(10) Patent No.: US 10,341,031 B2
(45) Date of Patent: Jul. 2, 2019

(54) REDUCTION OF PHOTODIODE NONLINEARITIES BY ADAPTIVE BIASING

(71) Applicant: The Government of the United States of America, as represented by the Secretary of the Navy, Washington, DC (US)

(72) Inventors: Meredith N. Hutchinson, Washington, DC (US); Nicholas Frigo, Silver Spring, MD (US); Caitlin R. S Williams, Hastings, NE (US)

( * ) Notice: Subject to any disclaimer, the term of this patent is extended or adjusted under 35 U.S.C. 154(b) by 0 days.

(21) Appl. No.: 15/949,138

(22) Filed: Apr. 10, 2018

(65) Prior Publication Data

US 2018/0294890 A1 Oct. 11, 2018

Related U.S. Application Data

(60) Provisional application No. 62/483,491, filed on Apr. 10, 2017.

(51) Int. Cl.
| | | |
|---|---|---|
| *H04B 10/69* | (2013.01) | |
| *H04B 10/80* | (2013.01) | |
| *H04B 10/2507* | (2013.01) | |
| *H04B 10/2575* | (2013.01) | |

(52) U.S. Cl.
CPC ..... *H04B 10/6911* (2013.01); *H04B 10/2507* (2013.01); *H04B 10/2575* (2013.01); *H04B 10/807* (2013.01)

(58) Field of Classification Search
CPC ........... H04B 10/2507; H04B 10/2575; H04B 10/6911; H04B 10/807; H04B 10/697; H04B 10/671; H04B 10/6931

USPC .................................................. 398/202-214
See application file for complete search history.

(56) References Cited

U.S. PATENT DOCUMENTS

| | | | | |
|---|---|---|---|---|
| 5,239,402 A | * | 8/1993 | Little, Jr. ................ | H03F 3/082 |
| | | | | 250/214 A |
| 5,347,388 A | * | 9/1994 | Little ...................... | H03F 3/082 |
| | | | | 250/214 A |
| 5,745,276 A | * | 4/1998 | Ho ..................... | H04B 10/6931 |
| | | | | 250/214 A |

(Continued)

*Primary Examiner* — Amritbir K Sandhu
(74) *Attorney, Agent, or Firm* — US Naval Research Laboratory; Suresh Koshy (57) ABSTRACT

A communication system includes an optical receiver that receives a modulated optical signal and converts same back to electrical form by a photodiode. The photodiode includes an optical input and a dc bias input, and outputs a photocurrent. The optical communication system includes a photodiode linear operation point feedback loop communicating with the photodiode based on an intermodulation distortion contour plot corresponding to the photodiode. The intermodulation distortion contour plot includes a plurality of linear operation points for the photodiode. The photodiode linear operation point feedback loop operates the photodiode at a respective operation point of the plurality of linear operation points. Optionally, the photodiode linear operation point feedback loop includes a voltage-biasing feedback loop receiving the photocurrent and outputting to the dc bias input a bias voltage based on the intermodulation distortion contour plot, and/or an optical power regulating feedback loop communicating with the optical input.

17 Claims, 9 Drawing Sheets

(56) References Cited

U.S. PATENT DOCUMENTS

| | | | | |
|---|---|---|---|---|
| 5,907,422 A | * | 5/1999 | Ho | H04B 10/6931 |
| | | | | 250/214 A |
| 6,570,149 B2 | | 5/2003 | Maruyama et al. | |
| 7,079,780 B1 | * | 7/2006 | Rollins | H04B 10/505 |
| | | | | 359/238 |
| 7,406,269 B2 | | 2/2008 | Becker et al. | |
| 8,969,783 B2 | | 3/2015 | Oomori | |
| 9,172,471 B2 | * | 10/2015 | Hutchinson | H04B 10/532 |
| 2002/0060827 A1 | * | 5/2002 | Agazzi | G11B 20/10009 |
| | | | | 398/158 |
| 2003/0231372 A1 | * | 12/2003 | Steier | G02F 1/0123 |
| | | | | 359/276 |
| 2005/0134715 A1 | | 6/2005 | Fowler et al. | |
| 2005/0169638 A1 | * | 8/2005 | Tayebati | H04B 10/25137 |
| | | | | 398/159 |
| 2005/0224697 A1 | * | 10/2005 | Nishiyama | H03F 1/30 |
| | | | | 250/214 A |
| 2006/0273942 A1 | * | 12/2006 | Koste | H03M 1/1033 |
| | | | | 341/118 |
| 2007/0041735 A1 | * | 2/2007 | Darcie | H04B 10/032 |
| | | | | 398/186 |
| 2009/0263144 A1 | * | 10/2009 | McKinney | H04B 10/2507 |
| | | | | 398/214 |
| 2015/0236790 A1 | * | 8/2015 | Guo | H04B 10/5053 |
| | | | | 398/25 |

* cited by examiner

REDUCTION OF PHOTODIODE NONLINEARITIES BY ADAPTIVE BIASING

CROSS-REFERENCE TO RELATED APPLICATIONS

This application claims priority to U.S. Provisional Patent Application Ser. No. 62/483,491, entitled "REDUCTION OF PHOTODIODE NONLINEARITIES BY ADAPTIVE BIASING," to Frigo et al., which was filed on 10 Apr. 2017 and is incorporated herein by reference.

BACKGROUND OF THE INVENTION

Field of the Invention

This invention relates in general to a method and/or apparatus for minimizing optical receiver impairments, and in particular to a method and/or apparatus for minimizing link impairments due to nonlinearity in the optical receiver's photodiode by adaptively biasing the photodiode.

Description of the Related Art

Faithful transmission of radio frequency ("RF") analog signals is important in applications ranging from wireless backhaul to radar signal processing. Such transport was affected by transmission over coaxial cable in the past, but the advent of semiconductor lasers with improved linearity and stability as well as electro-optic modulators with well-understood transfer functions have made optical transmission over photonic links preferable. In the last several decades, RF photonic links have become the standard approach for transport of high frequency RF information.

In essence, a photonic link interposes an optical transport system between an electronic RF source and its destination. Often, the RF signal is imposed on an optical carrier by modulating its intensity, and the modulated light is transported over an optical fiber to the destination. The low loss, lightweight, linear, interference-free optical medium delivers this optical signal to a receiver which converts the modulated optical signal back to electronic form for further processing.

RF links, then, have three basic components: the transmitter, optical medium, and the receiver. The transmitter, typically implemented with an electro-optic modulator, has a well-known sinusoidal transfer function. As such, third-order nonlinearities are dominant, but with proper biasing the second-order nonlinearity can be suppressed. In contrast, the fiber is the most robust component; optical nonlinearities therein are weak and first show up at optical sum and difference frequencies. That leads to an assessment of the nonlinearity of the photodiode in second order.

BRIEF SUMMARY OF THE INVENTION

An embodiment of the invention includes an apparatus, namely, an optical communication system. The optical communication system includes an optical receiver. The optical receiver includes a photodiode that in turn includes an optical input and a dc bias input, and that outputs a photocurrent. The apparatus includes a photodiode linear operation point feedback loop communicating with the photodiode based on an intermodulation distortion contour plot corresponding to the photodiode. The intermodulation distortion contour plot includes a plurality of linear operation points for the photodiode. The photodiode linear operation point feedback loop operates the photodiode at a respective operation point of the plurality of linear operation points. Optionally, the photodiode linear operation point feedback loop includes a voltage-biasing feedback loop receiving the photocurrent and outputting to the dc bias input a bias voltage based on the intermodulation distortion contour plot. Optionally, the photodiode linear operation point feedback loop includes an optical power regulating feedback loop communicating with the optical input.

Another embodiment of the invention includes an apparatus, namely, an optical communication system. The optical communication system includes an optical receiver. The optical receiver includes a photodiode, which includes an optical input and a dc bias input, and outputs a photocurrent. The optical receiver also includes a standard regulated voltage source receiving a control signal and outputting a bias voltage to the dc bias input. The optical receiver further includes an intermodulation distortion contour plot feedback loop. The intermodulation distortion contour plot feedback loop includes a spectrum analyzer receiving the photocurrent from the photodiode. The intermodulation distortion contour plot feedback loop also includes a control unit communicating with the spectrum analyzer. The control unit is configured to access directly or indirectly an intermodulation distortion contour plot corresponding to the photodiode. The intermodulation distortion contour plot includes a plurality of linear operation points for the photodiode. The intermodulation distortion contour plot feedback loop further includes a standard pseudonoise generator communicating with the control unit and the regulated voltage source and generating pseudo-noise. The pseudonoise generator outputs the control signal to the regulated voltage source. The regulated voltage source adjusts the bias voltage to the photodiode based on the pseudo-noise.

An embodiment of the invention reduces system impairments caused by photodiode order intermodulation distortion ("IMD") in photonic links. This embodiment of the invention employs "adaptive biasing" to exploit the existence of these optimal points. In an example of passive, adaptive biasing, the average current through the photodiode is used to set the bias to the operation point that minimizes the maximum impairment over all frequency plans the system might see. This minimizing of the maximum impairment, or "mini-max," solution, is elegantly simple to implement. Optionally, the mini-max impairment solution does not yield the minimal achievable impairment for all display frequencies. Rather, it can be viewed as extending the spurious-free dynamic range ("SFDR") and assuring a system specification.

In addition to this "passive" approach, which is independent of incident signals, other embodiments of the invention adopt more "active" approaches. Such embodiments of the invention react to a set of signals, change its characteristics, observe the effects these changes have on the set of signals, and then evaluates the likelihood that members of the signal set are spurious or "ghost" tones.

These active-approach embodiments of the invention require signals to be persistent enough in time that the system can react and evaluate, and require more processing power than the passive approach. In an example of an active-approach embodiment of the invention, the operation point is modulated, and the effect on the signal is indeterminate. In another example of an active-approach embodiment of the invention, the operation points were selected to do precise discrimination of candidate tones.

DETAILED DESCRIPTION OF THE INVENTION

Photodiode Nonlinearity

In principle, a photodiode is a linear device. That is, each incident photon has a high probability of creating an electron-hole pair in the absorption region, and these carriers are swept out of the absorption region to be recombined in the external circuit: basically, each absorbed photon creates an external electron in the detector circuit. However, the photodiode is not perfect, and a standard phenomenological treatment of its nonlinear behavior assumes that its behavior can be modeled as a memoryless transfer function relating the output photocurrent to the input light intensity.

Photodiodes are quite efficient and nearly linear, as a practical matter, and to a reasonable approximation the photocurrent is proportional to the incident optical power. In optical links in accordance with the instant invention, the optical intensity I for a single modulated optical carrier with modulation index m looks like $$I(t)=I_{dc}+I_{ac}=I_{dc}+mI_{dc}\cos\Omega t=I_{dc}+I(\Omega)\cos\Omega t \quad (1)$$

for an incident optical signal. For an ideal photodiode, the resultant electrical current would have the form, to within a constant for the diode responsivity, $$i(t)=i_{dc}+i_{ac}=i_{dc}+i(\Omega)\cos\Omega t+ \quad (2)$$

That is, the electrical current would largely mirror the optical intensity and higher order terms can often be ignored. In a real photodiode, especially at its highest frequencies, the responsivity is a function of frequency, with an amplitude and a phase. The determination of this parameter is of great interest to system designers.

In characterizing the nonlinear behavior of the output current, the most obvious method would be to Taylor expand the output current in powers of the input optical intensity. An efficient shortcut, which retains the flavor of the expansion, but puts it in a systems context, includes consideration of the ideal received photocurrent, $i_{ac}$ as the expansion parameter; it is close to a scaled version of the optical intensity. This embodiment of the invention includes a tool by which quick and automated characterizations is able to be performed. With this assumption, the output current of the photodiode can be expressed as the expansion $$i_{out}=i_{dc}+i_{ac}+\alpha_2 i_{ac}^2+\ldots \quad (3)$$

where the ac outputs are normalized to the observed ac inputs. For a two-tone input signal, this would result in an expected ac current of $$i_{ac}=i_1\sin\omega_1 t+i_2\sin\omega_2 t. \quad (4)$$

That is, if the photodiode output is observed on a standard electrical spectrum analyzer ("ESA"), components at $\omega_1$ and $\omega_2$ are seen. Because the ESA 150 records RF power, electrical powers of $P_1 \approx i_1^2$ and $P_2 \approx i_2^2$ is at the two frequencies are observed, where the scale factors due to the input coupling and photodiode responsivity are ignored.

To calculate the second order mixing tones, Equation (4) is substituted into Equation (3), and expect an output current of $$i_{out} \approx i_1\sin\omega_1 t+i_2\sin\omega_2 t+\alpha_2 i_1 i_2\cos(\omega_1-\omega_2)t-\alpha_2 i_1 i_2\cos(\omega_1+\omega_2)t. \quad (5)$$

In the presence of a second order nonlinearity, then, power at $\omega_1$ and $\omega_2$, the sum and difference RF frequencies, are expected. The magnitude of the nonlinear coefficient $\alpha_2$ is assumed to be a function of the output frequency. Then, because $$P(|\omega_1 \pm \omega_2|) \propto a_2(|\omega_1 \pm \omega_2|)^2 i_1^2 i_2^2,$$

powers are scaled to $P_0 \equiv 1$ mW, making conversion to dBm more convenient, and use the standard R=50Ω termination to arrive at a dimensionless measure of the nonlinearity defined as $$\gamma_2(|\omega_1 \pm \omega_2|)_{dB} \equiv 10\log_{10}\left[\frac{2P_0}{R}a_2^2(|\omega_1 \pm \omega_2|)\right] = \quad (6)$$
$$P(|\omega_1 \pm \omega_2|)_{dBm} - P(\omega_1)_{dBm} - P(\omega_2)_{dBm}.$$

in this form, $\gamma_2$ can be determined directly from reading the ESA 150 powers at $\omega_1$, $\omega_2$, $|\omega_1-\omega_2|$ and $\omega_1+\omega_2$. This characterization can be automated, and it provides a map of the second order nonlinearity of a photodiode as a function of the output IMD frequency, parameterized on the operation point.

Measuring Second Order Distortion in Photodiodes

An example of an apparatus to measure second order distortion in a photodiode is, for example, two independent laser sources are modulated with standard Mach-Zehnder modulators held at quadrature with standard bias boards, and the light from each is combined and sent to the photodiode under test. Standard polarization rotators permit the states of polarization to be changed independently or together. Another standard optical attenuator is placed before the photodiode to permit controlled attenuation of the photocurrent without disturbing the remainder of the experimental setup. An ESA 150 observes the RF powers at both fundamentals as well as the sum and difference frequencies. Data is recorded from the ESA, corrected for cable loss, then sorted and plotted as a function of output frequency for a large number of $V_b$, $I_{dc}$ operation points. One of ordinary skill in the art will readily appreciate that other methods or apparatuses for measuring second order distortion in photodiodes are available and are consistent with the provision of photodiode device characteristics used below according to an embodiment of the invention.

System Viewpoint

A system viewpoint is discussed for ease of understanding and not by way of limitation with respective to a specific, illustrative, standard commercial p-i-n photodiode with a 10

GHz bandwidth. For an array of operation points, experimental trace curves are taken, wherein, for example, the curves represent an objective function, such as the maximum value for $\gamma_2$ over the entire range of IMD frequencies up to 10 GHz. As an example of one such experimental trace curve, an operation point is given as ($V_b$=3 V, $I_{dc}$=10 mA), and the modulation frequency $f_1$ is swept while 2 is held constant at 3 GHz. Such an experimental trace curve includes one or more of three types of IMD products: "low difference" tones ($f_1<f_2$), "high difference" tones ($f_1>f_2$), and sum tones. Despite the different frequency plans for the IMD products, the nonlinear coefficient $\gamma_2$ falls on a single curve when the products are sorted by output frequency.

Figure 2:
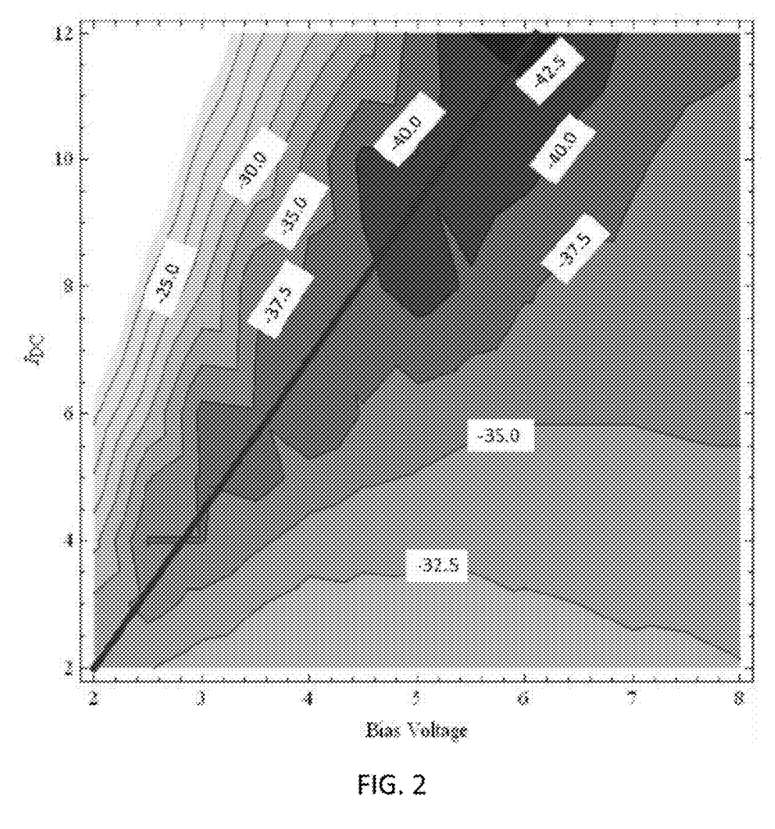
FIG. 2 is a graph of an illustrative intermodulation distortion contour plot for the illustrative photodiode.

Based on N. J. Frigo et al., Characterization of Photodiode Nonlinearities by Output Frequency Analysis, Journal of Lightwave Technology, Vol. 34, No. 20, 15 Oct. 2016, IEEE, Piscataway, N.J., USA, which is incorporated herein by reference, a surface of nonlinear coefficients for a photodiode to be used in an optical receiver in an optical communication system over a set of bias voltages and average currents is generated. For example, an illustrative surface of nonlinear coefficients for the diode over a set of bias voltages (2 V$\leq V_h \leq$8 V) and average currents (2 mA$\leq I_{dc} \leq$12 mA) is shown in FIG. 2. Each vertical stick represents a ($V_h$, $I_{dc}$) operation point: an experimental trace curve as discussed above. The maximum value of $\gamma_2$ for that experimental trace curve over the 10 GHz range was recorded. At the ($V_h$, $I_{dc}$) co-ordinates for that operation point, a heavy dot is plotted on the third axis at a position corresponding to the maximum $\gamma_2$ observed. A standard numerical interpolation function is fit through the data points and is plotted as the surface. Illustrative numerical interpolation functions according to embodiments of the invention include, for example, standard Direct numerical interpolation, standard Newton numerical interpolation, standard Lagrange numerical interpolation, and standard Spline numerical interpolation. To aid the eye, a vertical line is drawn upward to terminate at that heavy point. Given this array of points in 3D, a third order interpolation function is fit through the observed data and is plotted as a green surface. If the interpolated fit were perfect, each heavy dot would have half its volume above the surface. This surface has some structure.

Figure 1:
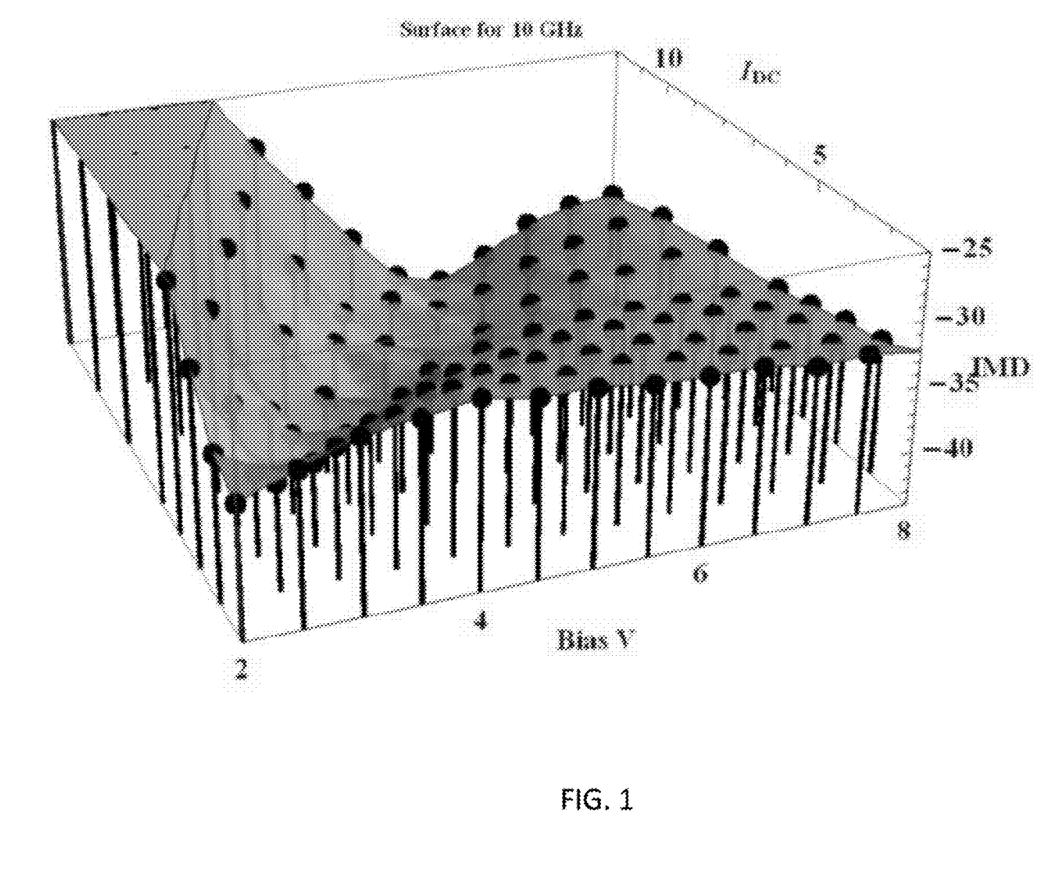
FIG. 1 is a graph of an illustrative surface of nonlinear coefficients for an illustrative photodiode.

For example, in the illustrative surface shown in FIG. 1, there is a "valley" running from the lower left point (2V, 2 mA) to about the midpoint (6 V, 12 mA) of the top boundary. This surface, which approximates a system specification for the minimal second order IMD for this photodiode, represents the worst case performance for IMD2 at each operation point. As such, it is taken as a specification for the photodiode's nonlinearity performance. As such, optimal operation points are those points located at the lowest points on this surface. A view of this surface is given by way of illustration in FIG. 2: the data for which is the same as in FIG. 1 for ease of understanding; this view is read as a contour plot of the interpolated surface function, and reveals the "valley" of FIG. 1 in a quantitative way. For the purpose of this specification, this contour plot is the intermodulation distortion contour plot. One of ordinary skill in the art will readily appreciate that every photodiode having respective specifications will have a respective intermodulation distortion contour plot. Again, this data should be viewed as a system specification: for instance, at the operation point (5 V, 9 mA), FIG. 2 indicates that, over the 10 GHz range, one expects, at worst. $\gamma_2 \approx$ –40 dB. In light of the variation in $\gamma_2$ shown in operation point plots (e.g. for a variation of $\approx$25 dB), the nonlinear performance at most IMD frequencies might be much better than this level, but the point of the intermodulation distortion contour plot is to identify the worst or limiting performance of a component or subsystem.

That there is structure in the intermodulation distortion contour plot provides the opportunity to optimize that system performance so as to exploit the characteristics of a given photodiode. That is, is preferable, ceteris paribus, to operate the photodiode at a point as low as possible on the surface. In this vein, the white diagonal line on the intermodulation distortion contour plot of FIG. 2 is roughly coincident with the set of optimal operation points, and corresponds to the equation $$I_{dc} = 2mA + \frac{V_b - 2V}{400\Omega}. \quad (7)$$

Guiding an optical communication system to its optimal operation point is the purpose of an embodiment of the invention, as discussed below.

Adaptive Biasing

Introduction

From a systems perspective, the nonlinearity penalty for operating an optical communication system can be optimized by choosing the operation point. Imagine an optical communications link as in FIG. 3 operating at an optimal point, such as (3 V, 4 mA). The optical communications link includes a transmitter, which modulates an optical signal according to an electrical RF signal from an RF source. The modulated optical signal traverses an optical medium, such as an optical fiber, to an optical receiver. The optical receiver includes a photodiode, which converts the modulated optical signal back to an RF electrical signal for an RF sink. This operation point is optimal in the following sense. The photodiode is at the end of the link and the optical intensity of the incoming signal is a parameter that it can't control; the transmitter's launch power and the link losses are variables outside of the control of the receiver. Roughly speaking, a high efficiency photodiode creates approximately one carrier pair for each photon absorbed, so the carrier generation rate (and hence the average current) is approximately set by the optical power at the receiver. The only other parameter the receiver can adjust is the bias voltage $V_h$. Assume there are two RF tones on the optical carrier(s) that each develop RF powers $P_i$–40 dBm signals at their respective frequencies. The IMD2 signals developed depend on the frequencies of the two tones, as FIG. 3 suggests. But from a system perspective, the worst case can be found, from either FIG. 1 or 2, as they both show that $\gamma_2 \leq$–37.5 dB, which translates into an IMD2 power of –117.5 dBm by virtue of Equation (6). On the other hand, if the receiver were biased at 5 V, for instance, FIG. 2 and Equation (6) indicate an additional performance penalty on the order of 4.5 dB, since $\gamma_2$ increases by that amount in making such a change in bias voltage. This penalty flows directly onto the SFDR for this impairment. Illustratively, for a noise floor of approximately –122 dBm, the IMD2 signal is buried in the noise for the optimal bias of 3 V, but is 4.5 dB above the noise floor for a 5 V bias. In other words, this IMD2 signal would present a ghost signal and would degrade the system's SFDR. Nonlinearity performance of a system can be affected, and thus optimized, by changing the operation point.

For the purpose of this specification "adaptive biasing," is understood to mean utilizing knowledge of the photodiode properties (e.g., its photocurrent and its bias voltage) to adjust the bias of a photodiode in such a way that the penalties from nonlinear intermodulation products are mitigated.

Bias Setting from Current Detection

An embodiment of the invention exploits the intermodulation distortion contour plot of map, such as discussed above by way of illustration relative to FIG. 2, in which the photodiode has been characterized and an approximate set of optimal operation points are known. This operation is explained, by way of example, by considering the operation of an illustrative optical communications system 10, as shown below in FIG. 3. The optical communications system 10 includes a standard RF source 20 that modulates an optical signal, a standard transmitter 30 transmitting a modulated optical signal over a standard optical medium (e.g., a standard optical fiber) to an optical receiver 40. As before, assume the optical communication system performs optimally at state A, when the optical receiver's photodiode is biased at 3V because the photocurrent is 4 mA. Now suppose that, for whatever reason, the system power increases by 3 dB; this results in a new average photocurrent of 8 mA, and a new state, represented by B on FIG. 4. At point B, the maximum $\gamma_2$ has increased by approximately 10 dB to −27.5 dB. This increased nonlinearity leads to IMD2 powers increasing by 10 dB by virtue of Equation (6). These larger spurious signals are a direct degradation of the system performance by 10 dB. (For clarity, the degradation of system performance concerns a system specification; there are some frequency plans for which this impairment is realized, but any individual frequency plan may or may not reflect this penalty. But, because the system specification is assumed to have the "worst performance over all frequencies," the system metric has decreased by this amount.) At this point, however, the system has recognized the increased current. A voltage-biasing feedback loop 70 (e.g. a standard regulated voltage source driven by a standard current mirror in one embodiment of the invention or a standard digitally controlled bias voltage in another embodiment of the invention) implementing Equation (7) increases the bias voltage to 4.4 V, driving the system to operating point C on FIG. 4. The voltage-biasing feedback loop 70, for example, includes a standard control unit 90, or controller, configured to adjust the photodiode 50's bias voltage using the intermodulation distortion contour plot. One of ordinary skill in the art will readily appreciate that implementations of such control unit configuration, for example, include application of a formula, namely, Equation (7), or a look-up table including photocurrent values and bias voltage values according to the photodiode's intermodulation distortion contour plot. At operation point C, $\gamma_2 \approx -39$ dB and the improvement, relative to operation point B is approximately 11.5 dB, and the SFDR specification improves by the same amount. At point C, the system's performance is also better (by about 1.5 dB) than it was at point A. However, that performance improvement was not available at point A; at operation point A, the system was already optimally biased. As shown in this example, optimality is necessarily local (as determined by $I_{dc}$), because the optical receiver need not have the option of changing the average current.

Figure 4:
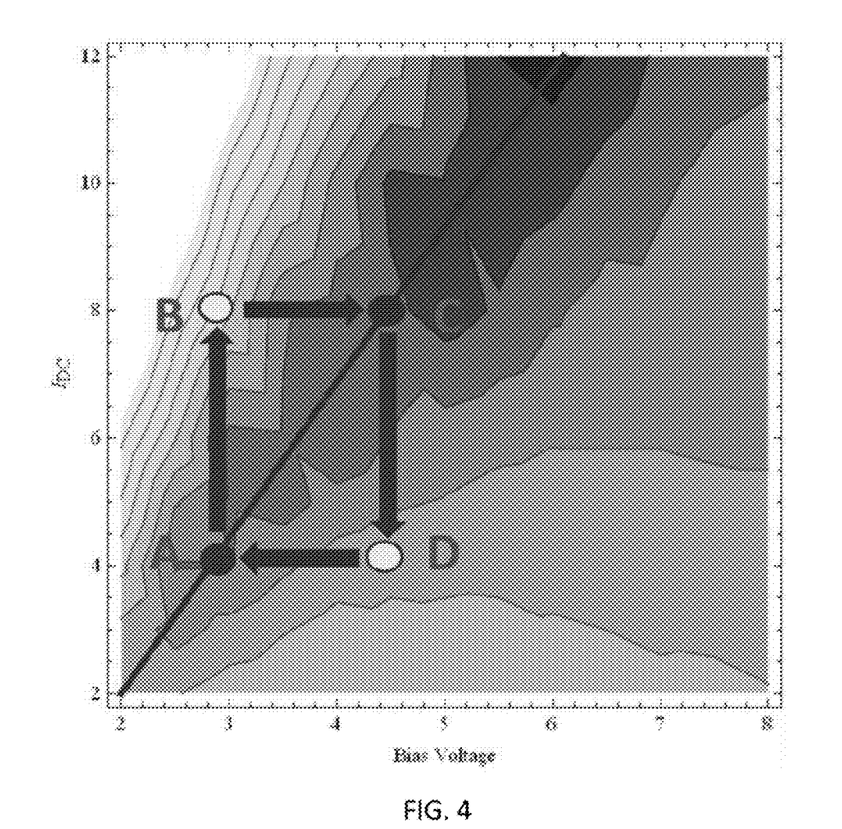
FIG. 4 is a graph of an illustrative intermodulation distortion contour plot for the illustrative photodiode overlaid with illustrative adaptive biasing via current sensing or power sensing.

If the optical receiver 40, operating at point C, were now to experience a reduction in power such that the average current returned to 4 mA, it would now find itself at, for example, operation point D in FIG. 4. The nonlinearity specification at this point is approximately −33.5 dB, which is not optimal biasing for this current. Discovering that it was off the optimal line described by Equation (7), the control unit adjusts the bias to $V_b=3$ V returning to the original point for an improvement in the SFDR specification of about 4 dB.

Figure 6:
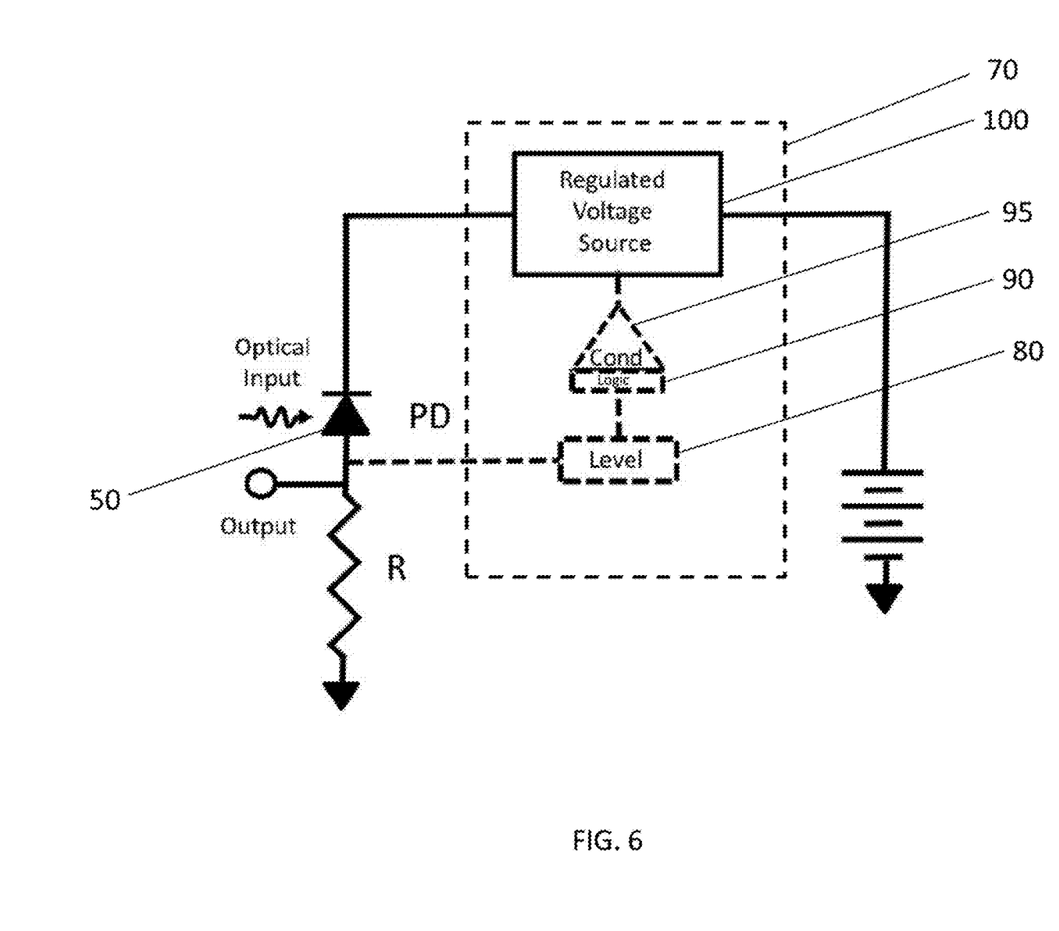
FIG. 6 is a block diagram of an embodiment of the instant invention including an illustrative voltage-biasing feedback loop.

A functional schematic of an implementation of this embodiment of the invention is shown, by way of example, in FIG. 6. A voltage proportional to the photocurrent in photodiode 50(PD) is choked or low-pass filtered and its dc level is detected by a standard level detector, providing an estimate for $I_{dc}$, the vertical coordinate for the operation point on FIGS. 2 and 4. For example, this voltage level is then conditioned by a standard conditioner 95 and sent to a standard voltage regulator 100 (e.g., a standard series-pass voltage regulator) to set the bias voltage, i.e., the horizontal coordinate for the operation point. Alternative embodiments of the invention include standard analog implementations using standard current mirror circuits or standard digital implementations in which the sensed level is analyzed to generate the input to a digital-to-analog converter. Although analog implementations are conceptually simpler, the low bandwidth needed (probably on the order of kHz) to follow variations in average current through the photodiode 50, as well as flexibility in handling startup and transient conditions, optionally make digital implementations more cost effective and robust.

Figure 5:
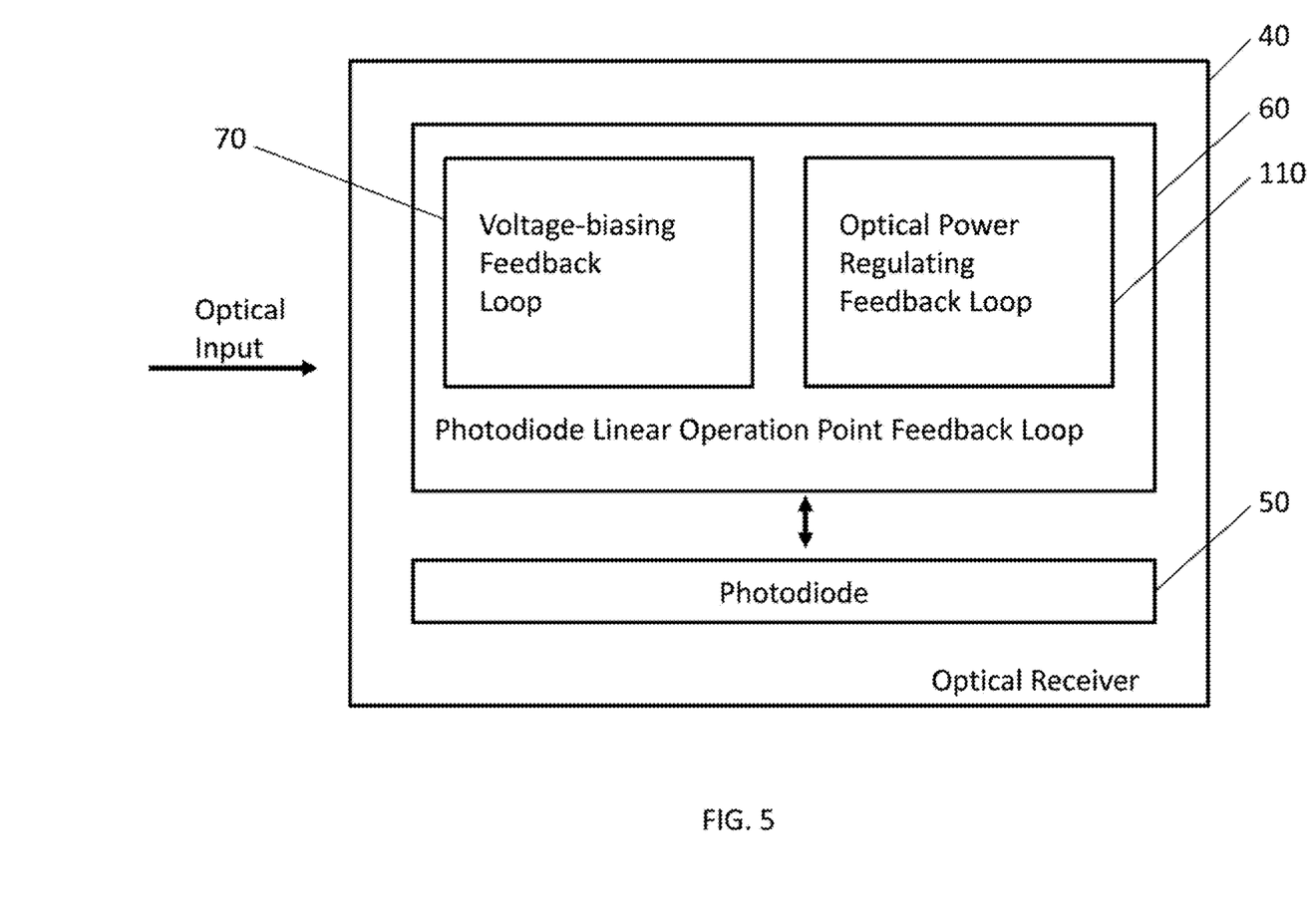
FIG. 5 is a block diagram of an embodiment of the instant invention including a photodiode linear operation point feedback loop.
Figure 7:
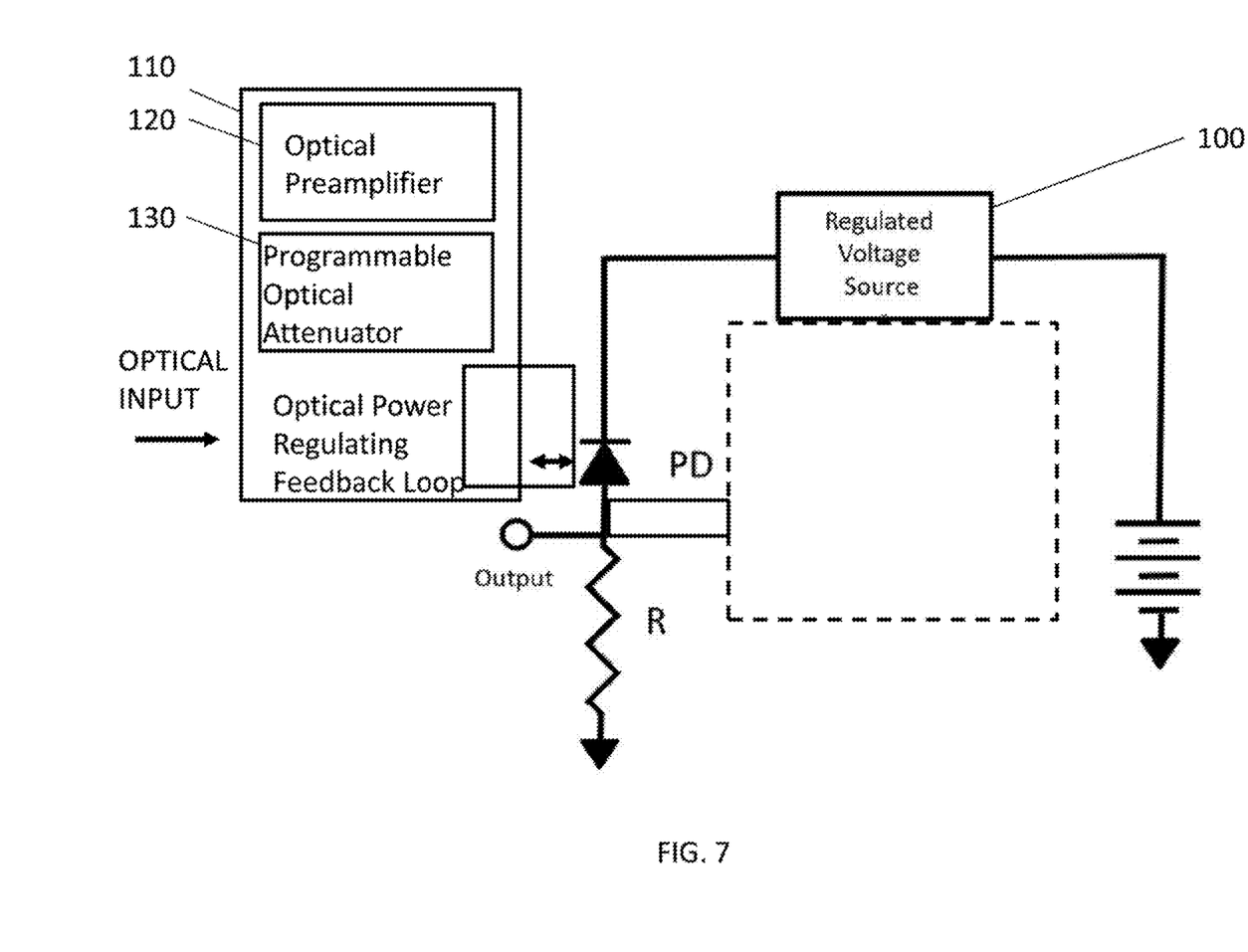
FIG. 7 is a block diagram of an embodiment of the instant invention including an illustrative optical power regulating feedback loop.

Concerning the control of the photodiode 50's bias voltage, an alternative embodiment of the invention includes an optical power regulating feedback loop 110, for example, as shown in FIGS. 5 and 7. For example, the optical power regulating feedback loop 110 regulates the optical power by employing a standard optical preamplifier 120 with a standard programmable optical attenuator 130 in front of the photodiode 50. In this embodiment of the invention, the optical communication system 10 has a second degree of freedom to adjust; so, a global minimum is achievable. Such an implementation optionally adds optical noise to the circuit, and optionally its usefulness is determined by various noise floors. This additional degree of freedom is optionally and advantageously used in embodiments of the invention discussed below.

Ghost Detection Through Interactive Analysis of Output Spectrum

Generally speaking, the impairment caused by photodiode nonlinearities can be viewed as the creation of "ghost tones" in the output spectrum, as would be viewed on a spectrum analyzer. Imagine, for instance, an optical communication system in which a wide RF spectrum is being surveyed and displayed on the ESA. Various system noise sources create a "noise floor" at the bottom of the ESA display, which plots RF spectral intensity vs. RF frequency. Above the noise floor, spikes correspond to tones at various frequencies and strengths. Given large spikes at, say 5 GHz and 6 GHz, and a much smaller spike at 1 GHz, the issue is the identification of that 1 GHz tone: is it a real source, or is it a "ghost," an intermodulation product caused by the two stronger tones at 5 GHz and 6 GHz? This, in essence, is the SFDR measure for the system.

In this section, an alternative adaptive biasing embodiment of the invention which can help the operator extend the system's utility is described. The real information needed by the optical communication system operator is the knowledge of whether a spectral feature is a ghost. If it were not a ghost, the effective system SFDR is extended by this embodiment of the invention by helping the operator to identify the feature as a ghost. In the case that the feature is a ghost, the presence of the tone is merely an annoyance and not a limit.

This alternative adaptive biasing embodiment of the invention involves an interaction of the detection system with the signals it detects. That is, if a tone is suspected to be a ghost tone, the optical communication system changes its characteristics and re-evaluate the tone after the change. For this embodiment of the invention, the candidate tone must be persistent over enough time for the system to identify the tone and devise a reaction. For example, optionally, it will not work if the candidate tone appears and then disappears instantly. Given this persistence criterion, an illustrative application involves a situation in which a small candidate tone appears on the spectrum and persists for multiple spectral scans. By changing the bias voltage, characteristics in the candidate tone's perceived power are able to be observed such that the operator is able to identify it as a ghost tone.

An illustrative method according to this embodiment of the invention is described as follows. First, the photodiode 50's response is established as somewhat insensitive to the bias voltage. For example, in an embodiment of the invention, the photodiode's response is considered sufficiently insensitive to the bias voltage at 0.2 dB change in power. Intuitively, this can be understood as the fact that the photodiode efficiently harvests electron-hole pairs created by absorbed photons. For a given incident optical signal, the carrier pairs created are either fruitfully collected into the external circuit and observed, or diffuse internally and recombine before making it to the external circuit. An increase in the bias voltage would help sweep the carriers more efficiently into the external circuit. In fact, there are three non-idealities: (i) There is an uncertainty in each measurement, shown as error bars, (ii) There is a general upward trend with increasing bias voltage, and (iii) there is a marked fall off below 2 V bias. This last point is understandable: above a few mA current, the photodiode is saturated at the lowest bias voltages and the heavy carrier production cannot be efficiently swept out of the photodiode's absorption region. Point (i) is an inherent limitation on accuracy in the instrumentation: our estimate of 0.2 dB errors corresponds to an accuracy of about 5%: further increases in accuracy would require extraordinary measures.

When operating in a non-saturated condition, point (ii) indicates that increasing bias voltage increases the efficiency with which each carrier pair is harvested in the external circuit: greater voltages would be expected to increase the drift (vs. diffusion) component of the carrier motion, and thus increase the external current.

Figure 8:
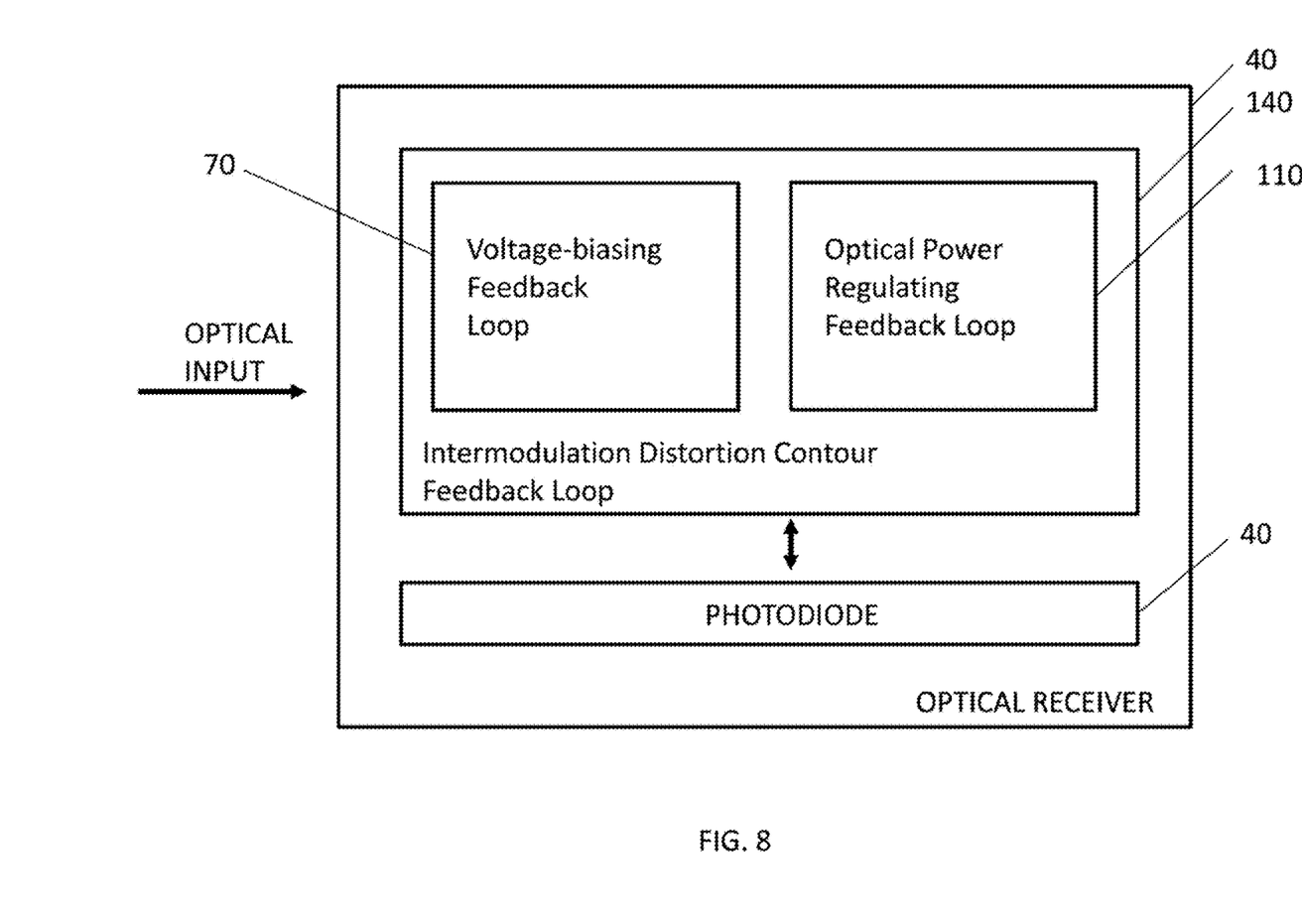
FIG. 8 is a block diagram of an embodiment of the instant invention including an intermodulation distortion contour plot feedback loop.
Figure 9:
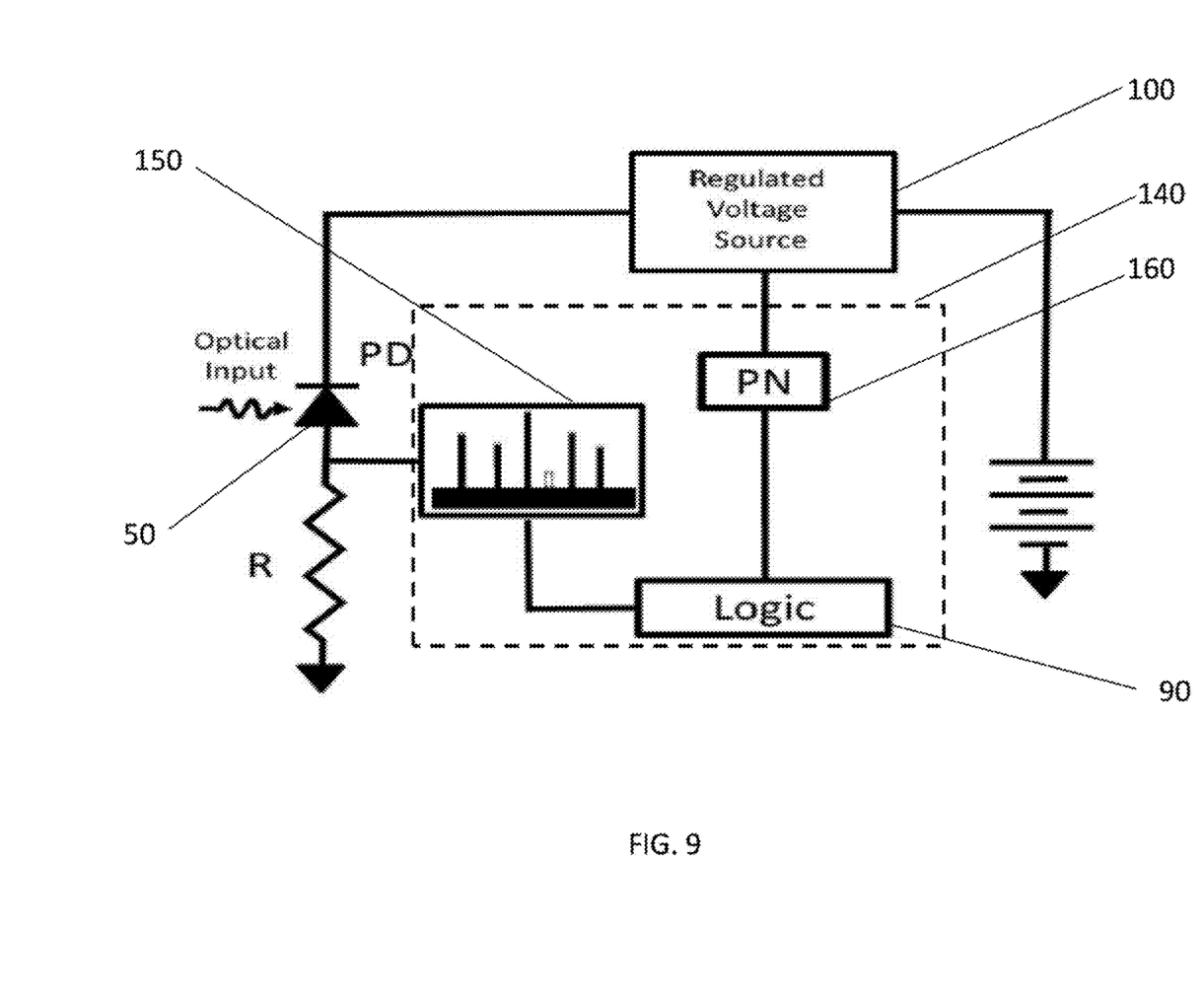
FIG. 9 is a block diagram of an embodiment of the instant invention including an illustrative intermodulation distortion contour plot feedback loop.

In short, a change in detected output power is very weakly connected to changes in the bias voltage. We can exploit this fact to identify ghost traces, and the basic scheme is illustrated in FIGS. 8 and 9. FIG. 9 shows an illustrative embodiment of the invention wherein the photodiode output is illustratively displayed on the ESA 150, a proxy for the system's detection apparatus. A candidate tone (e.g., the 4th bar from the left on the ESA display in FIG. 9) has appeared: is it a ghost or real target? A standard control unit or logic circuit is configured to identify the fact that this candidate tone is questionable, and signals a dithering signal, illustratively a pseudonoise generator (PN) 160 to create an identifiable code. The string is sent to a voltage regulator that controls the bias voltage on the photodiode. For real signals, the PN code will have a minimal and predictable effect on the displayed power. Each real tone's displayed power changes by roughly 0.1 dB in lock step with the PN sequence. However, if the candidate is a ghost tone, it is expected to behave differently. First, since it is a product, its displayed power will change by twice the amount that the real tones change, by virtue of Equation (6). More important, however, is the much wider variation exhibited by the change in the nonlinear coefficient $\gamma_2$ when the operation point is changed. An indication of this is given in FIGS. 2 and 4. The contours of the intermodulation distortion contour plots are the values for the maximum $\gamma_2$, but since all of the $\gamma_2$ curves tend toward higher values at the top end of the RF spectrum, these contours minimize the variations seen at individual frequencies: it is common to see variations of 20 dB for bias changes of 1 V. Consequently, as the PN sequence is run, the real tones will have minimal changes while the ghost tones will "wink" on and off with possibly very large variations in displayed power. These variations can be auto-correlated with the known PN sequence to enhance the probability of ghost detection.

In summary, in the embodiment of the invention discussed in this section, changes in bias does not eliminate the ghost tones; they exist on the system display, e.g., for characterization purposes. However, they offer the expectation that these ghost tones can be identified as such, so that functionally the utility of the detection system has increased; the SFDR has been increased in application even though spurious tones appear on the passive display. It is important to note that pathological cases could occur if the PN code amplitude is fixed, it is possible that the winking will be minimal due to an accidental odd combination of frequency plans and nonlinear behavior. This embodiment of the invention's test for ghosts delivers no false positives, but can deliver a false negative. That is, a ghost tone can masquerade as a real tone, but a real tone won't masquerade as a ghost tone.

Another embodiment of the invention is described as follows and requires detailed understanding of the photodiode characteristics and the signal spectrum. It is implemented physically in much the same way as in FIG. 6, but the demands on the logic block would be much more substantial. In this case, the PN codes run continuously, but the detailed curves therefor are stored and available for reference. For instance, a threshold is set to look at the highest power tones, to create a table of candidate IMD tones, to use the technique of the previous section to look at the outputs (i.e. the responses to the PN modulation of the bias voltage) and, if the particular products of the tones at this frequency plan and operation point are ambiguous, to add or subtract a constant voltage to the PN code to move to another operating point. This needn't be done in real time: there is optionally an evolving data stream, e.g., the top 100 peaks as (frequency, power) pairs that are accessed. The processing and discrimination are then thought of as a background cleanup utility that scrubs the files to eliminate signals that can be traced to spurious IMD.

Another embodiment of the invention uses the same characterization information as mentioned above, which characterization information is used to drive the system to the exact operation point needed to minimize any one of a set of mixing tones (from an analysis of a set of stored curves) that could create a spurious tone at a candidate frequency. The desire to implement such a process, costly in processing power, would depend on an ability to either pipeline the analysis on a separate processor or a compelling need to identify specific distortion sources.

Techniques such as these are clearly more costly in processing power, but offer the ultimate in system performance: by identifying and filtering out spurious data, the effective SFDR of the system could be enhanced tremendously. That is, rather than accepting the "passive" estimation of a system's SFDR, one could use a detailed knowledge of the photodiode properties to essentially eliminate nonlinearity as a system impairment and push to more fundamental limits to system performance.

The bias feedback loop is shorter when compared to linearization utilizing MZM distortion cancellation techniques. An embodiment of the invention actually reduces the overall amount of distortion in the system instead of performing conventional predistortion linearization. Additionally an embodiment of the invention allows for a more robust wideband system performance analysis, which can be critical to achieve desired performance metrics.

Figure 3:
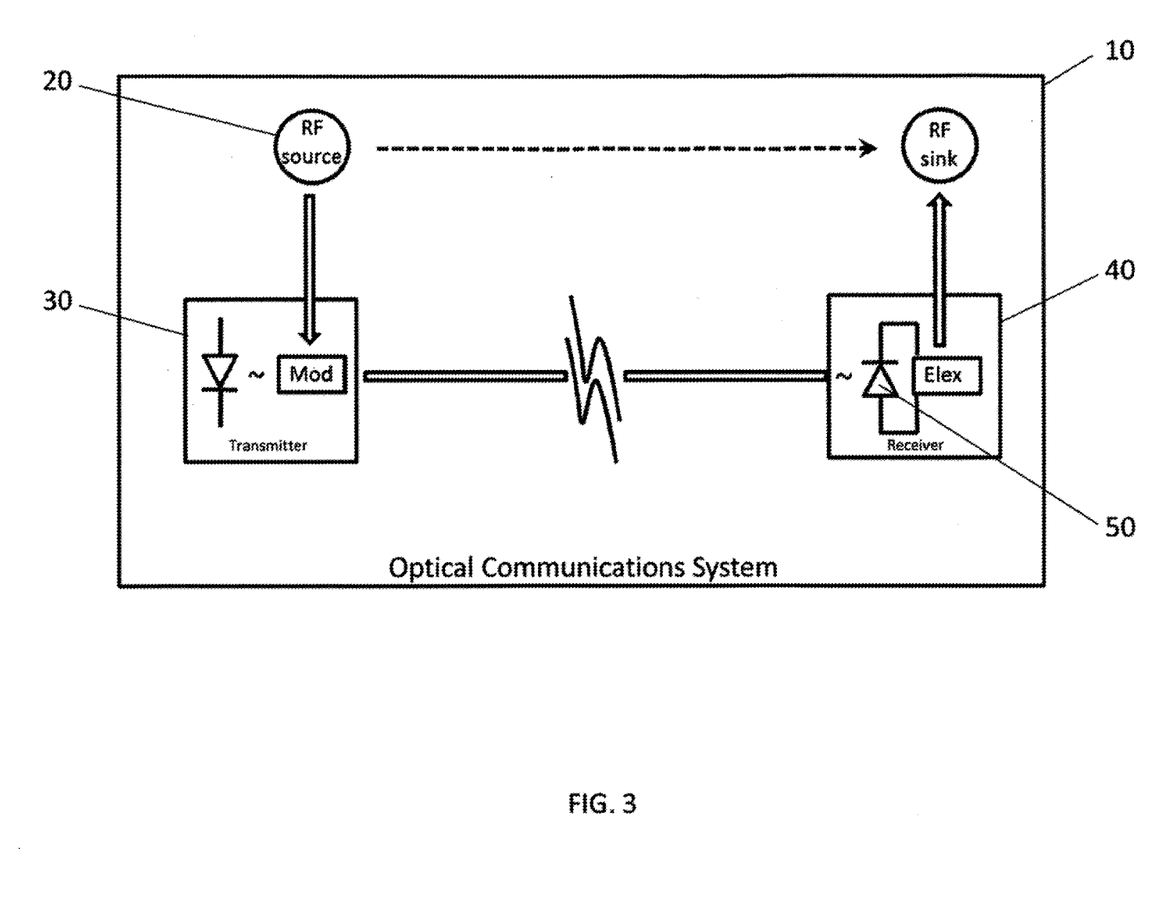
FIG. 3 is a block diagram of an RF link according to an embodiment of the instant invention.

Another embodiment of the invention includes an apparatus, namely, an optical communication system 10, for example, as shown by way of example in FIG. 3. In the optical communication system 10, a standard RF electrical source 20 modulates light at a standard optical transmitter 30, as shown by way of example in FIG. 3. The communication system 10 includes an optical receiver 40 that receives the modulated optical signal and converts same back to electrical form by a standard photodiode 50. The photodiode 50 includes an optical input and a dc bias input, and outputs a photocurrent. The optical communication system 10 includes a photodiode linear operation point feedback loop 60 communicating with the photodiode 50 based on an intermodulation distortion contour plot corresponding to the photodiode, as described above and such as shown by way of illustration in FIG. 2. The intermodulation distortion contour plot includes a plurality of linear operation points for the photodiode. Generation of an intermodulation distortion contour plot consistent with the instant invention is found, for example, in N. J. Frigo et al., as mentioned above. The photodiode linear operation point feedback loop 60 operates the photodiode 50 at a respective operation point of the plurality of linear operation points.

Optionally, as shown by way of example in FIG. 5, the photodiode linear operation point feedback loop 60 includes a voltage-biasing feedback loop 70 receiving the photocurrent and outputting to the dc bias input a bias voltage based on the intermodulation distortion contour plot. Optionally, the voltage-biasing feedback loop 70 includes a do voltage level detector 80 receiving the photocurrent and outputting a photocurrent level. The voltage-biasing feedback loop also includes a standard control unit 90 receiving the photocurrent level. The term control unit is understood herein to include a standard controller and its equivalents; for example, it is termed "Logic" in FIGS. 6 and 9. The control unit 90 is configured to analyze, using the photocurrent level, a standard comparative function based on the intermodulation distortion contour plot, as illustratively indicated by system shifts from operation point B to near optimal operation point C or from operation point D to near optimal operation point A as shown in FIG. 4. The control unit 90 outputs a control signal based on the analysis. The voltage-biasing feedback loop 70 further includes a standard regulated voltage source 100 receiving the control signal and outputting the bias voltage to the photodiode.

Optionally, as shown by way of example in FIGS. 8 and 9, the photodiode linear operation point feedback loop 60 includes an optical power regulating feedback loop 110 communicating with the optical input. The optical power regulating feedback loop 110 receives an optical signal at the optical input of the photodiode 50. The optical signal includes an optical signal power. The optical power regulating feedback loop 110 attenuates the optical signal power based on the result or output of the above-mentioned comparative function. Optionally, the optical power regulating feedback loop 110 includes a standard optical preamplifier 120 receiving the optical signal. The optical power regulating feedback loop also includes a standard optical attenuator 130 communicating with the optical preamplifier 120 and attenuating the optical signal power based in part on the result or output of the above-mentioned comparative function.

Another embodiment of the invention includes an optical communication system 10 and is described as follows, referring for example to FIGS. 3, 8, and 9. The optical communication system 10 includes an optical receiver 40. The optical receiver 40 includes a standard photodiode 50 including an optical input and a de bias input, and outputting a photocurrent. The optical receiver 40 also includes a standard regulated voltage source 100 receiving a control signal and outputting a bias voltage to the dc bias input. The optical receiver 40 further includes an intermodulation distortion contour plot feedback loop 140. The intermodulation distortion contour plot feedback loop 140 includes a standard spectrum analyzer 150 receiving the photocurrent from the photodiode 50. The intermodulation distortion contour plot feedback loop 140 also includes a standard control unit 90 communicating with the spectrum analyzer 150. The control unit 90 is configured to access directly or indirectly an intermodulation distortion contour plot corresponding to the photodiode 50. The intermodulation distortion contour plot, as described above, includes a plurality of linear operation points for the photodiode 50. The intermodulation distortion contour plot feedback loop 140 further includes a pseudonoise generator 160 communicating with the control unit 90 and the regulated voltage source 100 and generating pseudo-noise. The pseudonoise generator 160 outputs the control signal to the regulated voltage source 100. The regulated voltage source 100 adjusts the bias voltage to the photodiode 50 based on the pseudo-noise.

Optionally, the photocurrent includes an original radio frequency spectrum. The control unit 90 is configured to generate an expected radio frequency spectrum based in part on the original radio frequency spectrum and the intermodulation distortion contour plot. Optionally, the photocurrent includes an adjusted radio frequency spectrum based in part on the original radio frequency spectrum and the adjusted bias voltage. The control unit 90 is configured to compare the adjusted radio frequency spectrum and the expected radio frequency spectrum. Optionally, the original radio frequency spectrum includes at least one photodiode-generated spurious frequency. The control unit 90 is configured to discriminate the at least one photodiode-generated spurious frequency based on comparing the expected radio frequency spectrum with the adjusted radio frequency spectrum.

Optionally, the optical communication system 10 further includes a photodiode linear operation point feedback loop 60 communicating with the photodiode 50 based on the intermodulation distortion contour plot. The photodiode linear operation point feedback loop 60 operates the photodiode 50 at a respective operation point of the plurality of linear operation points. Optionally, the photodiode linear operation point feedback loop 60 includes a voltage-biasing feedback loop 70 receiving the photocurrent and outputting to the dc bias input the bias voltage based on the intermodulation distortion contour plot. Optionally, the voltage-biasing feedback loop 70 includes a dc voltage level detector 80 receiving the photocurrent and outputting a photocurrent level. The voltage-biasing feedback loop 70 also includes the control unit 90 receiving the photocurrent level and outputting the control signal based in in part on the photocurrent level and the intermodulation distortion contour plot. The voltage-biasing feedback loop 70 further includes the regulated voltage source 100 receiving the control signal and outputting the bias voltage to the photodiode 50. Optionally, the photodiode linear operation point feedback loop 60 includes an optical power regulating feedback loop 110 communicating with the optical input. The optical power regulating feedback loop 110 receives an optical signal at the optical input. The optical signal includes an optical signal power. The optical power regulating feedback loop 110 attenuates the optical signal power based in part on the intermodulation distortion contour plot. Optionally, the optical power regulating feedback loop 140 includes an optical preamplifier 120 receiving the optical signal. The optical power regulating feedback loop also includes an optical attenuator 130 communicating with the optical preamplifier 120 and attenuating the optical signal power based in part from the intermodulation distortion contour plot.

An embodiment of the invention includes computer program instructions executed by the control unit, which computer program instructions embody the steps, functions, filters, and/or subsystems described herein relative to the various adaptive biasing, discriminating, and/or characterization embodiments of the invention described above. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the program flow in the embodiments of the invention described above.

One of ordinary skill in the art will recognize that the methods, systems, and control laws discussed above may be implemented in software as software modules or instructions, in hardware (e.g., a standard application-specific integrated circuit ("ASIC")), or in a combination of software and hardware. The methods, systems, and control laws described herein may be implemented on many different types of processing devices by program code including program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms (e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
   an optical receiver comprising:
      a photodiode comprising an optical input and a dc bias input, and outputting a photocurrent; and
      a photodiode linear operation point feedback loop communicating with the photodiode based on an intermodulation distortion contour plot corresponding to the photodiode, the intermodulation distortion contour plot comprising a plurality of linear operation points for the photodiode, the photodiode linear operation point feedback loop operating the photodiode at a respective operation point of the plurality of linear operation points,
   wherein the photodiode comprises an average current,
   wherein the intermodulation distortion contour plot represents second order interrnodulation distortion for the photodiode based on the average current and a bias voltage.

2. The apparatus according to claim 1, wherein the photodiode linear operation point feedback loop comprises a voltage-biasing feedback loop receiving the photocurrent and outputting to the de bias input the bias voltage based on the intermodulation distortion contour plot.

3. The apparatus according to claim 2, wherein the voltage-biasing feedback loop comprises:
   a dc voltage level detector receiving the photocurrent and outputting a photocurrent level;
   a control unit receiving the photocurrent level, the control unit being configured to analyze using the photocurrent level a comparative function based on the intermodulation distortion contour plot, the control unit outputting a control signal; and
   a regulated voltage source receiving the control signal and outputting the bias voltage to the photodiode.

4. The apparatus according to claim 1, wherein the photodiode linear operation point feedback loop comprises:

an optical power regulating feedback loop communicating with the optical input, the optical power regulating feedback loop receiving an optical signal at the optical input, the optical signal comprising an optical signal power, the optical power regulating feedback loop attenuating the optical signal power based on a comparative function.

5. The apparatus according to claim 4, wherein the optical power regulating feedback loop comprises:
an optical preamplifier receiving the optical signal; and
an optical attenuator communicating with the optical preamplifier and attenuating the optical signal power based in part from the intermodulation distortion contour plot.

6. An apparatus comprising:
an optical receiver further comprising:
    a photodiode further comprising an optical input and a dc bias input, and outputting a photocurrent; a regulated voltage source receiving a control signal and outputting a bias voltage to the dc bias input; and
    a feedback loop further comprising:
        a spectrum analyzer receiving the photocurrent from the photodiode;
        a control unit communicating with the spectrum analyzer, the control unit being configured to access one of directly and indirectly an intermodulation distortion contour plot corresponding to the photodiode, the intermodulation distortion contour plot comprising a plurality of linear operation points for the photodiode; and
        a pseudonoise generator communicating with the control unit and the regulated voltage source and generating pseudo-noise, the pseudonoise generator outputting the control signal to the regulated voltage source, the regulated voltage source adjusting the bias voltage to the photodiode based on the generated pseudo-noise,
        wherein the photodiode comprises an average current,
        wherein the intermodulation distortion contour plot represents second order intermodulation distortion for the photodiode based on the average current and a bias voltage.

7. The apparatus according to claim 6, wherein the photocurrent comprises an original radio frequency spectrum, the control unit being configured to generate an expected radio frequency spectrum based in part on the original radio frequency spectrum and the intermodulation distortion contour plot.

8. The apparatus according to claim 7, wherein the photocurrent comprises an adjusted radio frequency spectrum based in part on the original radio frequency spectrum and the adjusted bias voltage, the control unit comparing the adjusted radio frequency spectrum and the expected radio frequency spectrum.

9. The apparatus according to claim 8, wherein the original radio frequency spectrum comprises at least one photodiode-generated spurious frequency, the control unit being configured to discriminate the at least one photodiode-generated spurious frequency based on comparing the expected radio frequency spectrum with the adjusted radio frequency spectrum.

10. The apparatus according to claim 8, wherein the original radio frequency spectrum comprises at least one photodiode-generated spurious frequency, the control unit being configured to characterize the at least one photodiode-generated spurious frequency based on comparing the expected radio frequency spectrum with the adjusted radio frequency spectrum.

11. The apparatus according to claim 6, further comprising:
a photodiode linear operation point feedback loop communicating with the photodiode based on the intermodulation distortion contour plot, the photodiode linear operation point feedback loop operating the photodiode at a respective operation point of the plurality of linear operation points.

12. The apparatus according to claim 11, wherein the photodiode linear operation point feedback loop comprises a voltage-biasing feedback loop receiving the photocurrent and outputting to the dc bias input the bias voltage based on the intermodulation distortion contour plot.

13. The apparatus according to claim 12, wherein the voltage-biasing feedback loop comprises:
a dc voltage level detector receiving the photocurrent and outputting a photocurrent level;
the control unit receiving the photocurrent level and outputting the control signal based in part on the photocurrent level and the intermodulation distortion contour plot;
the regulated voltage source receiving the control signal and outputting the bias voltage to the photodiode.

14. The apparatus according to claim 12, wherein the photodiode linear operation point feedback loop comprises:
an optical power regulating feedback loop communicating with the optical input, the optical power regulating feedback loop receiving an optical signal at the optical input, the optical signal comprising an optical signal power, the optical power regulating feedback loop attenuating the optical signal power based in part on the intermodulation distortion contour plot.

15. The apparatus according to claim 14, wherein the optical power regulating feedback loop comprises:
an optical preamplifier receiving the optical signal; and
an optical attenuator communicating with the optical preamplifier and attenuating the optical signal power based in part from the intermodulation distortion contour plot.

16. An apparatus comprising:
an optical receiver comprising:
    a photodiode comprising an optical input and a dc bias input, and outputting a photocurrent; and
    a photodiode linear operation point feedback loop communicating with said photodiode based on an intermodulation distortion contour plot corresponding to said photodiode, the intermodulation distortion contour plot comprising a plurality of linear operation points for said photodiode, said photodiode linear operation point feedback loop operating said photodiode at a respective operation point of the plurality of linear operation points,
    wherein said photodiode linear operation point feedback loop comprises a voltage-biasing feedback loop receiving the photocurrent and outputting to said dc bias input a bias voltage based on the intermodulation distortion contour plot,
    wherein the voltage-biasing feedback loop comprises:
        a dc voltage level detector receiving the photocurrent and outputting a photocurrent level;
        a control unit receiving the photocurrent level, said control unit being configured to analyze using the photocurrent level a comparative function based on the intermodulation distortion contour plot, said control unit outputting a control signal; and a regulated voltage source receiving the control signal and outputting the bias voltage to said photodiode.

17. An apparatus comprising:

an optical receiver comprising:
- a photodiode comprising an optical input and a dc bias input, and outputting a photocurrent; a regulated voltage source receiving a control signal and outputting a bias voltage to said dc bias input; and
- a feedback loop comprising:
  - a spectrum analyzer receiving the photocurrent from said photodiode;
  - a control unit communicating with said spectrum analyzer, said control unit being configured to access one of directly and indirectly an intermodulation distortion contour plot corresponding to said photodiode, the intermodulation distortion contour plot comprising a plurality of linear operation points for said photodiode; and
  - a pseudonoise generator communicating with said control unit and said regulated voltage source and generating pseudo-noise, said pseudonoise generator outputting the control signal to the regulated voltage source, said regulated voltage source adjusting the bias voltage to said photodiode based on the pseudo-noise, wherein the photocurrent comprises an original radio frequency spectrum, said control unit being configured to generate an expected radio frequency spectrum based in part on the original radio frequency spectrum and the intermodulation distortion contour plot.

* * * * *